United States Patent Office 3,532,790
Patented Oct. 6, 1970

3,532,790
SOMATIC ANTIGEN VACCINES FROM LYSED INACTIVATED BACTERIA AND PROCESS FOR PRODUCING THEM
Louis Greenberg and Margaret Y. Cooper, Ottawa, Ontario, Canada, assignors to Canadian Patents and Development Limited, Ottawa, Ontario, Canada, a company
No Drawing. Continuation of application Ser. No. 420,130, Dec. 21, 1964, which is a continuation-in part of application Ser. No. 396,373, Sept. 14, 1964. This application Feb. 23, 1968, Ser. No. 707,876
Int. Cl. A61k 27/00
U.S. Cl. 424—92     21 Claims

ABSTRACT OF THE DISCLOSURE

In the preparation of somatic antigen vaccines from whole pathogenic bacteria, the bacteria are grown in a culture medium to which has been added sufficient amino acids from the group consisting of glycine, proline, valine, histidine, aspartic acid, and argenine, and mixture thereof, in an amount up to 5% w./v. whereby the bacteria so grown have substantially weakened cell walls and are more readily lysed, in some cases the baceteria upon inactivation undergoing complete autolysis. The vaccines produced by lysis of inactivated cells so grown are generally relatively clear, containing all of the inner and outer bacterial antigens along with the lysed cellular material with substantial absence of sediment and whole cells. The products are generally more potent than corresponding vaccines produced in the conventional manner and cause fewer side reactions. A preferred application is the preparation of vaccines for prevention of bovine mastitis.

---

This application is a continuation of our application Ser. No. 420,130 filed Dec. 21, 1964, now abandoned which, in turn, is a continuation-in-part of application Ser. No. 396,373, filed Sept. 14, 1964 and now abandoned.

A typical method of producing bacterial vaccines is to grow bacteria on suitable culture media, harvest the resulting growth, standardize the concentration of organisms, and then inactivate or kill the bacteria by means of heat, a preservative or both heat and preservative.

Bacterial vaccines may be prepared from laboratory strains of bacteria or from baceteria derived directly from the patient receiving the vaccine. In the latter case they are referred to as autogenous vaccines. Vaccines which contain several strains of bacteria are called polyvalent vaccines. Vaccines containing bacteria belonging to two or more species are referred to as mixed vaccines. Vaccines may also be prepared from fractions of the bacteria or from bacterial exudates. Diphtheria and tetanus toxoids are examples of the latter. In the case of the present invention the bacteria are completely lysed so that all of the bacterial antigens—inner and outer are present in effective form. The inventors have named this type of vaccine somatic-antigen vaccine.

Vaccines prepared by the present invention may be of monovalent, polyvalent or mixed types.

In the copending application Ser. No. 260,057 filed in the United States by the present inventors on Feb. 20, 1963, now abandoned a method of preparing somatic antigen vaccines is disclosed which involves the lysing of killed cells of pathogenic bacteria by subjecting them to the action of a proteolytic enzyme such as Dornase (desoxyribonuclease) which causes lysis of the cells without destroying their antigenicity.

It has now been found that lysing of the cells can be greatly facilitated by growing the cells in a medium containing an amino acid constiutent or constituents which promotes the development of weakened cells walls. As a result of this the weakened bacteria lyse very readily once they have been inactivated by a suitable preservative or bactericide such as Thimerosol. Thimerosol is the generic or trade name for sodium ethyl mercurithiosalicylate and is presently preferred as the preservative or killing agent, however, others such as thymocresol, benzalkonium chloride and phenol may be used. The present inventors employed Thimerosol produced by the firm of Eli Lilly and Company under the registered trade mark Merthiolate.

The use of glycine in the disruption of bacterial cells has been previously described by E. S. Maculla and P. B. Cowles in Science, vol. 107, p. 376 (1948). In this publication, the glycine is added in relatively high concentrations to mass cells after harvesting. However, as judged by microscopic examination the disruption is minimal and the extracts obtained are probably due to the elution of intracellular material into the glycine solution. In a preferred embodiment of the present invention glycine is added initially to the growth medium so that the resulting bacteria have cell walls particularly susceptible to lysis. Indeed, it has been found that in some cases such cells will undergo sufficient autolysis to obviate the need for accessory treatments.

Attempts to produce somatic antigen vaccines by the Maculla and Cowles technique have not been successful in this laboratory. A series of experiments was carried out with certain Staphylococcus organisms by adding glycine to the live cultures at concentrations of 0.5% to 3.5%. Another experiment was performed with typhoid organisms and in this case a 7.5% concentration of glycine was used. No lysis of the cells was demonstrable in any of these experiments nor was any real disruption of the cells obtained although it is believed that the concentration of protein nitrogen in the supernate did increase. Subsequent potency tests in experimental animals indicated that neither the Staphylococcus nor typhoid vaccines prepared in this way had appreciable immunizing activity.

The present invention, therefore, provides an improved process for the production of somatic antigen vaccines from bacteria in which process the bacteria are grown in a nutrient medium containing one or more of the amino acids utilized or associated with the synthesis of cell structures by said bacteria in an amount sufficient to result in the formation of bacteria more susceptible to lysis.

An important embodiment of the present invention comprises the production of a mastitis vaccine to be used for immunizing cows against mastitis. Mastitis is usually caused by Staphylococcal or Streptococcal organisms or by a mixture of the two types. Mastitis may also be at least partly caused by other organisms such as Escherichia coli. Accordingly, the mastitis vaccine of the present invention may be a staphylococcal vaccine, or any of the three to which the E. coli somatic antigen vaccine has been added. The E. coli somatic antigen vaccine of the present invention is prepared by a combination of initial growth in glycine and subsequent lysis assisted by a suitable proteolytic enzyme such as for example Pronase (registered trade mark). A further embodiment of the invention comprises the production of a somatic antigen vaccine with Clostridium. For example, *Clostridium chaivoei* vaccine for blackleg disease in cattle has been prepared in a manner similar to that for the *E. coli* vaccine and successfully tested.

As an additional aspect the present invention provides a process for the production of somatic antigen vaccine of bacteria chosen from the group consisting of Staphylococcus, Streptococcus and Neisseria and Clostridium comprising the steps of growing the bacteria in a medium containing glycine in a lysis-promoting concentration of from between about 0.01–5.0% w./v.

As another additional aspect, the present invention provides a process for the production of somatic antigen vaccine of bacteria chosen from the group consisting of Staphylococcus, Streptococcus and Neisseria and Clostridium the glycine being present in the growing medium in an amount sufficient to result in the formation of bacteria, having weakened cell walls, thereby facilitating lysis of such cells once the bacteria have been inactivated by suitable preservatives. Preferably, the growing medium should contain between about 0.1 and about 5.0 percent by weight glycine.

Somatic antigen vaccines were prepared and tested in accordance with the invention disclosed herein. Some examples of typical preparations and assay tests which were carried out on the results of these preparations are given herein. These examples and tests are not considered to be limiting in any way. The invention is believed to be limited only by the claims appended hereto.

Although not wishing to be limited or committed to this explanation, the present inventors believe that the high order of antigenicity resulting from the practise of the present invention is due to the retention in the vaccine of those antigenic substances which are believed to be responsible for immunity. The vaccines are generally relatively clear, with substantial absence of sediment and whole cells.

The optimum concentration of glycine can vary widely depending upon the organism. For most organisms tested the optimum concentration has fallen within the range of between about 0.1–5.0% w./v. It has been observed that in general the higher the amino acid level that can be used without adversely affecting growth, the faster the lysis.

EXAMPLE 1

While the medium used in preparing the vaccines of some of the examples which follow is a modified Frantz Medium (Watson & Scherp, J. Immunol., 81, p. 331 (1958)), it will be appreciated that in some circumstances other media may be preferred.

Solution A:
 Casamino acids (Tech) DIFCO—10 gm.
 Cystine (1.2% solution in 0.1 N HCl)—1.0 ml.
 KCl—0.090 gm.
 $Na_2HPO_4 \cdot 12H_2O$—6.5 gm.
 Phenol Red 0.1% solution—8.0 ml.
 Distilled $H_2O$ to 1000 ml.
Solution B:
 $MgSO_4 \cdot 7H_2O$—2.4 gm.
 Glucose—20.0 gm.
 Distilled $H_2O$ to 100 ml.

Casamino acids are a casein hydrolysate containing low molecular weight material. Each solution is adjusted to pH 7.4 with NaOH and autoclaved at 121° C. for 15 minutes. Normally in using the Frantz Medium solution B is added aseptically to solution A at a rate of 25 ml./liter for general use. Experience has shown that some bacterial species do better when this proportion is varied; for example it has been found that the following proportions are preferred for the following different organisms:

|  | B to 1 liter of A, ml. |
| --- | --- |
| Neisseria | 50 |
| Staphylococcus | 15 |
| Streptococcus | 40 |

EXAMPLE 2

Preparation of meningococcus vaccine

The seed cultures were taken directly from lyophilized ampoules into flasks containing 250 ml. of the medium of Example 1 and incubated at 37° C. overnight (approximately 18 hours) on a shaking machine set at 40 r.p.m. Twenty ml. from the seed flasks were seeded in liter flasks containing 500 ml. of the modified Frantz Medium containing 1% w./v. glycine. The glycine may be added to Solution A at the time of manufacture or aseptically to the mixture prior to seeding. The inoculated flasks were then incubated in the same manner as the seed flasks on a shaker set at 40 r.p.m. for 18 to 20 hours. Following incubation, the flasks were removed from the incubator and 1:100 solution of Merthiolate was added to each 500 ml. flask so as to give a final concentration of 1:10,000 Merthiolate. The flasks were then left at room temperature for one week. In this period, the vaccine, which at the beginning usually has a nephelometer reading equivalent to a McFarland Standard 3, had completely cleared and registered zero. The vaccines were then tested for sterility, innocuity, toxicity, pyrogenicity and potency. (See Example 6).

Meningococcus is the common name for *Neisseria meningitidis* of the family Neisseriaceae. For example, the following meningococcus strains were used:

M1027 (S. Branham)
Z1 (Lapeyssonnie)
M129 (Lapeyssonnie)

EXAMPLE 3

Preparation of staphylococcus vaccines

Staphylococcus vaccines are produced essentially as in Examples 1 and 2 but it has been found that different concentrations of glycine are required for optimum lysis for the different strains as noted below.

| Phage group | Strain No. | Phage type | Percent glycine | Percent strains in human vaccine |
| --- | --- | --- | --- | --- |
| I | 584763 | (80/81) | 3.5 | 30 |
| II | 596535 | (3A/3B/3C) | 3.5 | 30 |
| III | 596510 | 7/47/53/54/75+ | 3.5 | 30 |
| IV | 596297 | 42D | 4.5 | 5 |
| M? | 6032 | KS6 | 3.5 | 5 |

The staphylococcus vaccines have been found to maintain their potency after autoclaving at 120° C. and 20 p.s.i.g. pressure for 15 minutes.

EXAMPLE 4

Preparation of mastitis vaccine

This vaccine, which is a combination of Staphylococcus and Streptococcus organisms, differed in its manufacturing technique in that the organisms were grown on a solid medium rather than in fluid. The seed strains were first grown on 2% nutrient agar slopes for 18 hours at 37° C. for approximately 20 hours and the growth washed off with either sterile distilled water or 0.5% saline. The lysis takes longer if saline is used. The harvest organisms have a concentration of approximately $3 \times 10^{10}$ organisms per ml., and give a reading of 10 on a McFarland nephelometer. It will be appreciated that cells may be grown in nutrient broth rather than on solid nutrient agar in which case the cell concentration may be of the order of between about $1 \times 10^8$–$1 \times 10^9$ per ml. The cells are substantially completely lysed between 7 to 10 days following the addition of Merthiolate to a final concentration of 1:10,000. The optimal concentration of glycine for the promotion of lysis varies with the organism. In our experience, the most suitable concentrations of glycine for various strains grown on nutrient agar are as follows:

Staph. strain:                    Percent of strains in mastitis vaccine
    584763—3.0% glycine _____ 15
    596535—3.0% glycine _____ 10
    596510—3.0% glycine _____ 15
    6032—3.5% glycine _____ 20
    596297—3.5% glycine _____ 10
Staph. dog strain:
    1.5% glycine _____ 10
Strep. A 36 (1118):
    1.5% glycine _____ 10
Strep. C (1628):
    1.5% glycine _____ 10

On the other hand if streptococcus organisms A 36 (1118) and C (1628) are omitted a suitable combination would be:

Percent of strains
                                   in mastitis vaccine
    584763—3.0% glycine _____ 15
    596535—3.0% glycine _____ 15
    596510—3.0% glycine _____ 25
    6032—3.5% glycine _____ 30
    596297—3.5% glycine _____ 10
Staph. dog strain:
    1.5% glycine _____ 1

EXAMPLE 5

Preparation of streptococcus vaccine

Human strains used, Type A:
    T36 _____ 1118
    T19 _____ 616
    T12 _____ 602

Lyophilized ampoules were seeded to flasks of heart infusion broth and grown at 37° C. overnight. Ten ml. of seed culture were added to each 500 ml. lot of Frantz Media containing 2.0% glycine, they were then incubated at 37° C. on shakers for 20 hours. Bacterial counts of the live organisms are made and enough of a 1:100 Merthiolate stock solution was added to give a final concentration of 1:10,000. The flasks were then held at room temperature until lysis had been completed. This took from 7 to 10 days. Tests for bacterial sterility, toxicity, safety, and potency were carried out after the organisms had been completely lysed.

EXAMPLE 6

Results

The following Tables 1 and 2 are examples of results obtained in assays performed on rabbits with mastitis vaccine prepared from both Staphylococcus and Streptococcus organisms. Four rabbits were used for a single lot. Each rabbit was given 1 ml. of vaccine intramuscularly and 0.2 ml. intradermally in each of 5 spots on the back of the rabbit. Two weeks later, two of the test animals were challenged intradermally with a 0.1 ml. dose of 15 different strains of staphylococcus and the remaining two were challenged intradermally with a 0.1 ml. dose of 15 different streptococcal strains. Four control (non-vaccinated) rabbits were injected with the same dose of the same strains, at the same time and in the same way as the vaccinated animals. Two were injected with the Staphylococci and the other two with Streptococci. The rabbits were observed for 2 to 4 days. At the end of this time, the control rabbits should have a large necrotic area at each injection site whereas the sites of injection on immunized rabbits should be clear or relatively so. In the tables which follow the results of zone sizes obtained in an actual experiment are given. The sizes are stated in millimeters, an X indicates the presence of plus formation and necrosis.

TABLE 1

Rabbits vaccinated with Staph. vaccine (human) and challenged with 15 Staphylococcus strains, in dilution 1:75, from lyophilized ampoules 0.1 ml. per spot.

| Control rabbits | | | | | | Staph. P.S.A. vaccine Lot 7-3 (dried) | | | | | |
|---|---|---|---|---|---|---|---|---|---|---|---|
| Rabbit No. 4 Staph. | | | Rabbit No. 3 Staph. | | | Rabbit No. 5 Staph. | | | Rabbit No. 6 Staph. | | |
| 20X | 10 | 20X | 25X | 15X | 20X | 0 | 0 | 0 | 0 | 0 | 0 |
| 15X | 15X | 25X | 20X | 20X | 25X | 0 | 5 | 0 | 0 | 0 | 0 |
| 15X | 10 | 25X | 15 | 10 | 25X | 0 | 0 | 0 | 5 | 0 | 0 |
| 20X | 20X | 25X | 15X | 15 | 25X | 5 | 0 | 5 | 5 | 5 | 5 |
| 25X | 25X | 20X | 25X | 25X | 15X | 10 | 10 | 0 | 5 | 5 | 0 |

TABLE 2

Rabbits vaccinated with mastitis vaccine and challenged intradermally with 15 Staphylococcus or 15 Streptococcus strains.

| Control rabbits | | | | | | Rabbits vaccinated with mastitis vaccine No. 4-3G | | | | | |
|---|---|---|---|---|---|---|---|---|---|---|---|
| Staph. | | | Strep. | | | Staph. | | | Strep. | | |
| 10X | 25X | 20X | 20X | 15 | 10 | 0 | 0 | 10 | 20X | 0 | 5 |
| 25X | 30X | 0 | 30X | 25X | 20 | 10 | 10 | 5 | 0 | 10 | 5 |
| 5 | 50X | 10 | 10 | 15 | 10 | 10 | 5 | 5 | 0 | 0 | 0 |
| 35X | 20X | 40X | 10 | 20X | 10X | 10 | 0 | 5 | 0 | 0 | 0 |
| 40X | 30X | 30X | 25X | 20X | 15 | 5 | 5 | 5 | 0 | 0 | 0 |
| _____ Pink blush noted _____ | | | | | | _____ No blush noted _____ | | | | | |

NOTE: Staph. challenge 15 strains 1:75 dil.=0.1 ml. per spot. Strep. challenge 1:50 dil.=0.1 ml. per spot.

It is evident that a high degree of protection is obtained using the vaccines of the present invention. It has been found that the somatic antigen vaccines produced by the process of the present invention are in general more potent than corresponding conventional whole bacterial vaccines and cause fewer side reactions in humans than conventional whole bacterial vaccines.

The assay procedure for Meningococcus vaccine was to immunize 60 mice, using 20 mice for each of 3 separate dilutions as indicated in Table 3. Twenty mice were kept as controls. Two to three weeks later, the animals were challenged with a living virulent Meningococcus strain (*Neisseria meningitidis*) and the animals observed for a period of one week. The results of a typical assay are recorded in Table 3.

The challenge strain for this experiment was the Canadian Dept. of Health and Welfare Laboratory of Hygiene's strain Z1. A 4 hour culture grown in Frantz Medium on a shaking machine and incubated at 37° C. was used. The challenge dose was suspended in 4% mucin and was administered intraperitoneally at 1.0 ml. per mouse.

TABLE 3

| | Dilution | Deaths | | | | Survivors |
|---|---|---|---|---|---|---|
| | | 24 hrs. | 48 hrs. | 72 hrs. | 144 hrs. | |
| Vaccines of Meningo. P.S.A. No. 1 Pooled Lots 2 and 3. | (1) | 0/20 | 2/20 | 2/20 | 2/20 | 18/20 |
| | 1-5 | 3/20 | 6/20 | 6/20 | 6/20 | 14/20 |
| | 1-10 | 6/20 | 7/20 | 9/20 | 10/20 | 10/20 |
| Vaccines of Meningo. P.S.A. No. 1 Pooled Lots 4 and 5. | (1) | 2/18 | 2/18 | 2/18 | 2/18 | 16/18 |
| | 1-5 | 0/20 | 0/20 | 0/20 | 0/20 | 20/20 |
| | 1-10 | 5/20 | 11/20 | 11/20 | 11/20 | 9/20 |
| Controls | | 15/20 | 18/20 | 18/20 | 18/20 | 2/20 |

[1] Undilution.

EXAMPLE 7

Strains of *Escherichia coli* (*E. coli*) were grown on a modified Frantz Medium as in Examples 1 and 2. Sufficient glycine was added to the medium to give a concentration of 1.5% w./v. Incubation was at 37° C. for 18 to 24 hours on a shaking machine. Merthiolate was then added to give a final concentration of 1:10,000. Cultures were then reincubated on the shaker for 18–24 hours. Viability tests were carried out at this point to assure that all the bacteria were inactivated. While still on the shaking machine a protease enzyme derived from Streptomyces griseus was added to the flasks in either one or two stages. A total of 10 micrograms of the enzyme was added with shaking for 24 hours between additions. The shaking was continued from 1 to 3 days until lysis was substantially complete. A relatively clear vaccine was obtained which has been found to be effective for protecting mice against challenge with strains of *E. coli* homologous to the vaccine strain. An example of a typical assay is shown in Table 4. This vaccine may be added in small proportions to mastitis vaccine since *E. coli* may be responsible for some cases of Bovine mastitis. It may also have a use for humans in prevention of infantile diarrhea caused by *E. coli*.

RESULTS
TABLE 4

| Escherichia coli strain | | Challenge results | | |
|---|---|---|---|---|
| Strain No. | Vaccine | Challenge | No. of mice | Survivors |
| A634760 | 0-26 | 0-26 | 10 | 9 |
| Control | | 0-26 | 10 | 0 |
| B634760 | 0-26 | 0-26 | 9 | 7 |
| Control | | 0-26 | 10 | 0 |

EXAMPLE 8

Preparation of backleg vaccine

*Seed.*—Five strains of *Clostridium chauvoei* e.g., "WHW," "F," Deal, Oklahoma, and Tosper, are grown on liver thioglycolate broth at 37° C. for 24 hours. These seed cultures are then used to inoculate the production medium at the rate of 1.0 ml. per 100 ml. of medium. The composition of the production medium is as follows:

Ingredient: Percent w./v.
- Trypone _____ 4.0.
- Sodium chloride __ 0.5.
- Yeast extract _____ 0.5 (Amber X).
- L-cysteine _____ 0.05.
- Glycine _____ 0.25–0.75 (varies with the strain).
- MgSO$_4$·7H$_2$O ____ 0.5.
- Dextrose _____ 0.5 (added aseptically from a sterile 50% stock solution).

The pH is adjusted to 7.8 with 5 N NaOH before autoclaving at 121° C. for 15 minutes for sterilization. Reference J. Comp. Path. 67, 157 (1957).

Production

The pH is adjusted to 7.8 with 5 N NaOH before hours and then inactivated with 0.5% formalin. Pronase is then added at the rate of 5.0 mcgm./ml. from a stock solution containing 0.25 mg./ml. After the addition of the enzyme, the pH is adjusted to 8.0 with 5 N NaOH. This is activated at 45° C. for one hour in a water bath and then left at room temperature for 7 to 10 days, observed daily for pH changes and adjusted if necessary, and progress of lysis observed. When lysis is complete, the lysate is tested for sterility, safety and potency in the usual manner.

Testing—Potency

Five guinea pigs were vaccinated intramuscularly with 1.0 ml. of *Costridium chauvoei* vaccine prepared from lysed whole cells as described above. Ten days later, a 1.0 ml. booster injection was given by the same route. Ten days subsequent to the booster injection, these five guinea pigs, along with five unvaccinated control guinea pigs, were challenged intramuscularly with 0.5 ml. of a standard *Costridium chauvoei* spore suspension containing 10 M.L.D. in 0.5 ml. of suspension. Four (80%) of the five vaccinated guinea pigs survived. All five unvaccinated guinea pigs died.

EXAMPLE 9

Lysis with other amino acids

Whereas glycine is a preferred amino acid other amino acids can promote lysis of bacterial cells in a similar manner to produce useful vaccines. This is shown in Table 5.

TABLE 5

| Amino acid | Concentration, percent | No. of organisma | | Lysis |
|---|---|---|---|---|
| | | Staph. strain No. 584763 | Staph. strain No. 596297 | |
| L-argenine | 1.0 | 7×10$^7$ | 8.5×10$^7$ | + |
| D,L-aspartic | 2.5 | 1×10$^7$ | 3×10$^7$ | + |
| L-histidine | 1.5 | 1×10$^7$ | 8×10$^7$ | + |
| D,L-valine | 3.0 | 5×10$^7$ | 8×10$^7$ | + |
| L-proline | 3.0 | 2×10$^7$ | 6×10$^7$ | + |
| Glycine (control) | 3.5 | 2×10$^7$ | 12×10$^7$ | + |

Additional strains of bacteria which have been employed in the preparation of useful vaccines are as follows:

Staphylococcus.—1645, 59174, 598022, 597497, 595354, 598074, 6003.

Streptococcus.—1510T35, 589T1, 601T11, 618T22, 599T9.

Meningococcus.—D2 (Lepeyssonnie), M111, N1 (Lapeyssonie), 962 (Brannon), M132 (Lapeyssonnie).

We claim:

1. A process for the production of a somatic antigen Streptococcus vaccine comprising the steps of growing the Streptococcus bacteria in a culture medium containing amino acid from the group consisting of glycine, proline, valine, histidine, aspartic acid, and argenine, and mixtures thereof, in an autolysis-promoting concentration of about 1 to about 5% w./v., inactivating the bacteria, and holding the inactivated bacteria at room temperature for at least one day to effect autolysis of the bacterial cells.

2. Process as set forth in claim 1, wherein the amino acid is glycine.

3. An aqueous somatic antigen vaccine prepared according to the process of claim 1 and consisting essentially of substantially all of the inner and outer bacterial antigens along with all of the cellular material resulting from autolysis of inactivated Streptococcus organisms in a cell concentration of at least 1×10$^7$ per ml.

4. The method of immunizing animals against bacterial infection which comprises injecting the animal with an effective amount of the order of 2 c.c., of the somatic antigen vaccine of claim 3.

5. A process for the production of a somatic antigen Staphylococcus vaccine comprising the steps of growing the Staphylococcus bacteria in a culture medium containing amino acid from the group consisting of glycine, proline, valine, histidine, aspartic acid, and argenine, and mixtures thereof, in an autolysis-promoting concentration of about 1 to about 5%, w./v., inactivating the bacteria, and holding the inactivated bacteria at room temperature for at least one day to effect autolysis of the bacterial cells.

6. Process as set forth in claim 5, wherein the amino acid is glycine.

7. An aqueous somatic antigen vaccine prepared according to the process of claim 5 and consisting essentially of substantially all of the inner and outer bacterial antigens along with all of the cellular material resulting from autolysis of inactivated Staphylococcus organisms in a cell concentration of at least 1×10$^7$ per ml.

8. The method of immunizing animals against bacterial infection which comprises injecting the animal with an effective amount of the order of 2 c.c., of the somatic antigen vaccine of claim 7.

9. A vaccine as set forth in claim 7 wherein the Staphylococcus organisms are a mixture of strains.

10. A process for the production of a somatic antigen Neisseriaceae vaccine comprising the steps of growing the Neisseriaceae bacteria in a culture medium containing amino acid from the group consisting of glycine, proline, valine, histidine, aspartic acid, and argenine, and mixtures thereof, in an autolysis-promoting concentration of about 1 to about 5% w./v., inactivating the bacteria, and holding the inactivated bacteria at room temperature for at least one day to effect autolysis of the bacterial cells.

11. Process as set forth in claim 10, wherein the amino acid is glycine.

12. An aqueous somatic antigen vaccine prepared according to the process of claim 10 and consisting essentially of substantially all of the inner and outer bacterial antigens along with all of the cellular material resulting from autolysis of inactivated Neisseriaceae organisms in a cell concentration of at least $1 \times 10^7$ per mil.

13. The method of immunizing animals against bacterial infection which comprises injecting the animal with an effective amount of the order of 2 c.c., of the somatic antigen vaccine of claim 12.

14. A process for the production of a somatic *Escherichia coli* vaccine comprising the steps of growing the *Escherichia coli* bacteria in a culture medium containing amino acid from the group consisting of glycine, proline, valine, histidine, aspartic acid, and argenine, and mixtures thereof, in an autolysis-promoting concentration of about 1 to about 5%, w./v., inactivating the bateria, and holding the inactivated bacteria at room temperature for at least one day to effect autolysis of the bacterial cells.

15. Process as set forth in claim 14, wherein the amino acid is glycine.

16. An aqueous somatic antigen vaccine prepared according to the process of claim 14 and consisting essentially of substantially all of the inner and outer bacterial antigens along with all of the cellular material resulting from autolysis of inactivated *Escherichia coli* organisms in a cell concentration of at least $1 \times 10^7$ per mil.

17. The method of immunizing animals against bacterial infection which comprises injecting the animal with an effective amount of the order of 2 c.c., of the somatic antigen vaccine of claim 16.

18. A process for the production of a somatic antigen Clostridium vaccine comprising the steps of growing the Clostridium bacteria in a culture medium containing amino acid from the group consisting of glycine, proline, valine, histidine, aspartic acid, and argenine, and mixtures thereof, in an autolysis-promoting concentration of about 0.25 to about 5% w./v., inactivating the bacteria, and holding the inactivated bacteria at room temperature for at least one day to effect autolysis of the bacterial cells.

19. Process as set forth in claim 18, wherein the amino acid is glycine.

20. An aqueous somatic antigen vaccine prepared according to the process of claim 18 and consisting essentially of substantially all of the inner and outer bacterial antigens along with all of the cellular material resulting from autolysis of inactivated Clostridial organisms in a cell concentration of at least $1 \times 10^7$ per ml.

21. The method of immunizing animals against bacterial infection which comprises injecting the animal with an effective amount of the order of 2 c.c., of the somatic antigen vaccine of claim 20.

References Cited

John et al., Journal of Pharmacy and Pharmacology, vol. 15, pp. 346 and 347, May 1963.

Leyh-Bouille, Soc. Biol., vol 155, pp. 2457–2461, Dec. 16, 1961.

Greenberg et al., Canadian Medical Association Journal, vol. 84, pp. 945–947, April 29, 1961.

Levine et al., A Compilation of Culture Media for the Cultivation of Microorganisms, published by the Williams & Wilkins Co., Baltimore, 1930, pp. 134 and 135.

RICHARD L. HUFF, Primary Examiner